Figure 1:
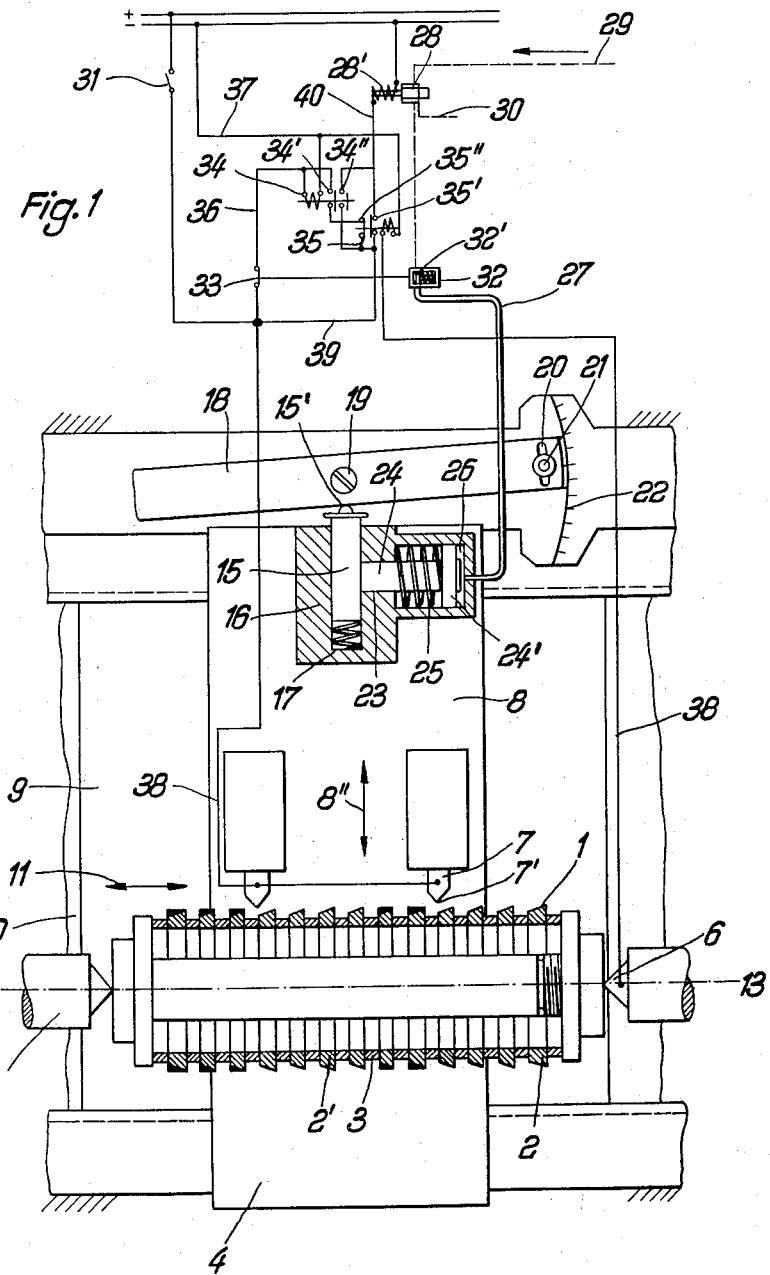

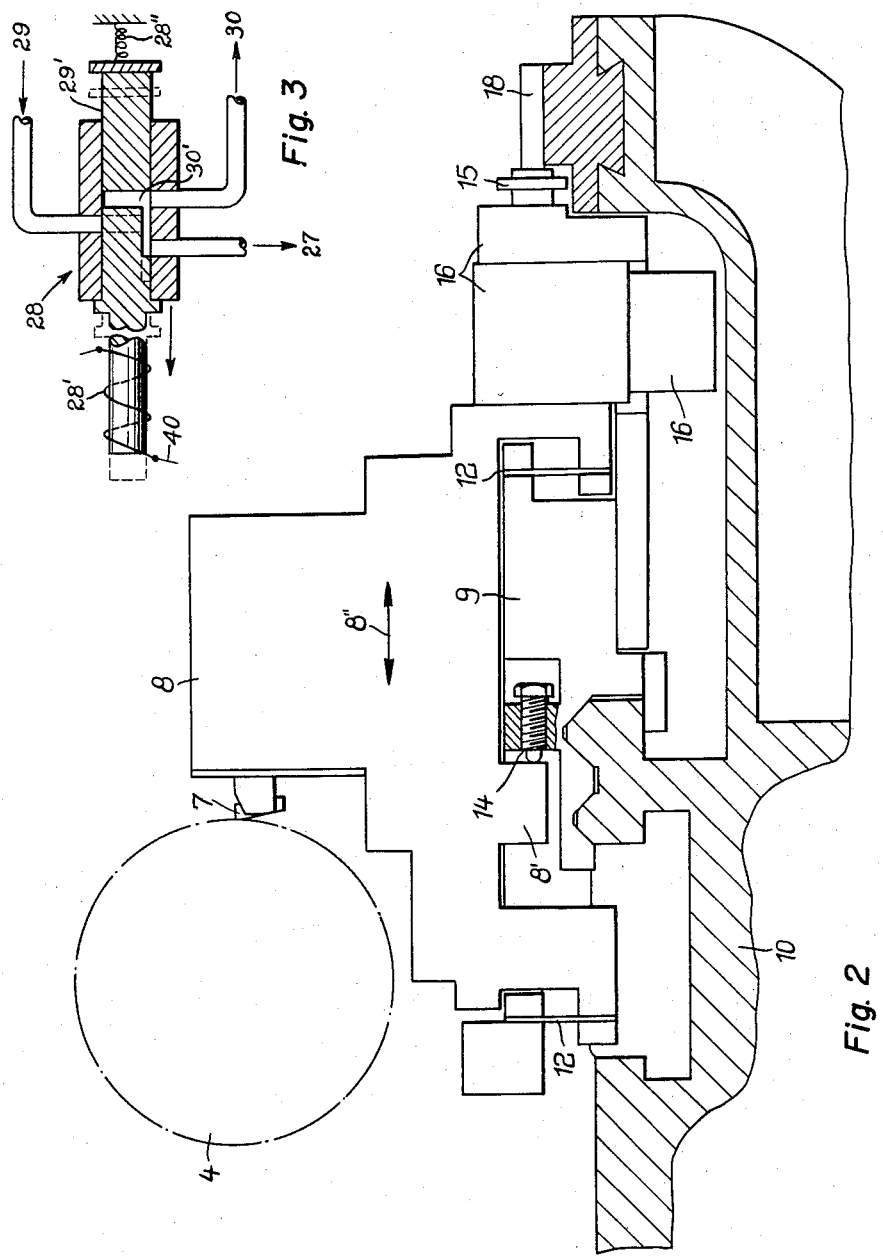

United States Patent Office 3,024,685
Patented Mar. 13, 1962

3,024,685
MACHINES FOR TURNING RINGS
Werner Buchmüller, Burscheid, near Koln, and Helmut Mey, Opladen, Germany, assignors to Goetzewerke Friedrich Goetze Aktiengesellschaft, Koln, Germany, a German company
Filed Sept. 3, 1958, Ser. No. 758,778
Claims priority, application Germany Sept. 27, 1957
2 Claims. (Cl. 82—17)

This invention relates to a machine for turning rings to provide them with a conical outer surface, a number of rings to be turned being clamped together in axial alignment with spacers of smaller diameter than the rings between them. Such an assembly of rings and spacers, which is rotated as a single unit, is called a packet.

The machine has a support which carries cutting tools, and which performs a forward feed movement of the tool in an axial direction as well as a radial movement relative to the ring packet to provide the necessary conicity.

In known machines for this purpose, each ring of the packet is machined by a separate tool. Thus there are as many tools as there are individual rings in the packet. The spacing between the individual tools is the same as the spacing between the rings. All these tools on their common support carry out the required axial movement and the radial movement simultaneously. Such machines are expensive because they require a large number of tools. Also, the assembly and setting-up of the tools is difficult and time consuming, because they have individually to be very carefully adjusted.

Machines have also been made which operate with four tools. Each of these tools is associated with a part of the packet, all these parts being joined together to form the complete packet. A disadvantage of such machines has been found to be that a separate copy or pattern rod was required for each tool, the copy rods having to be adjusted to the thickness of the spacers between the individual rings. This necessitated having on hand a large number of copy rods because the spacers had to be surface ground from time to time, an operation which altered their thickness.

The object of the present invention is to attempt to overcome the disadvantages of these known machines and to provide a machine in which the individual rings are turned successively by means of a single copying device with one or more tools, without the necessity of adjusting the tool or tools automatically by hand, the tool or tools carrying out repeated radial movements together with a continuous axial feed movement. According to the present invention such a machine has a support for holding the cutting tool or tools which is movable radially to the ring packet on a carriage which is movable parallel to the axis of the packet, the support being urged away from the packet against a stop on the carriage and having a feeler which runs along a straight guide, which is adjustable in accordance with the required conicity of the rings to move the support towards the packet, the feeler being controlled by a clamping device which alternately clamps the feeler rigidly to the support and releases it again to make the feeler alternately operative and inoperative so that a tool held by the support is moved alternately towards the packet to cut a ring and away again preparatorily to cutting the next ring.

The clamping device preferably comprises a clamping pin which is movable transversely to the feeler and which is pressed against the feeler by fluid pressure acting on a piston. An electro-magnetic control for the supply of fluid under pressure is preferably provided. This control includes a circuit which passes through the cutting tool and the packet and is completed only when the tool is touching the packet.

An example of a machine constructed in accordance with the invention is illustrated in the accompanying drawing in which:

FIGURE 1 is a diagrammatic plan of the machine showing also a circuit diagram; and FIGURE 2 is a diagrammatic cross-section through a part of the machine; and FIGURE 3 is a diagrammatic representation of a valve employed in the device.

Rings 2 which are to be provided with conical surfaces 1 are clamped together to form a packet 4, spacers 3 of smaller diameter than the rings being interposed between the rings. The packet 4 is clamped between centering points 5 and 6 of the machine and is rotated. A tool 7 is mounted on a support 8, which is moved radially relatively to the rings 2, in the direction of the double arrow 8″. The support 8 is mounted on a carriage 9, which is movable along the bed of the machine, and carries out the axial forward movement of the tool in the direction of the double arrow 11. The support 8 carrying the tool 7 is under the action of leaf springs 12, which tend to press a shoulder 8′ on the support 8 against a stop screw 14 on the carriage 9 (see FIGURE 2). When the shoulder 8′ is pressed against the stop screw 14 on the carriage 9, then the tool 7 takes up the position illustrated in FIGURE 1 in which it is not in engagement with any one of the rings in the packet 4.

A feeler 15 is also provided on the support 8. This feeler is movably mounted in a feeler housing 16 and is under the action of a compression spring 17. The spring 17 presses a sliding nose 15′, which is provided on the end of the feeler 15, against a guide plate 18. The plate can be moved about a pivot pin 19 which is fixed to the framework of the machine and can be fixed in a position inclined to the axis of the packet 4 by a locking screw 21 passing through a slot 20 in the plate 18. The adjustment angle, for the inclined position of the guide plate 18 is indicated by a scale 22 and corresponds to the desired angle of taper of the surface 1 of the rings 2. The feeler 15 co-operates with a clamping pin 24 which slides in a bore 23 running transversely to the feeler. The clamping pin is under the action of a compression spring 25 and can be firmly pressed against the feeler 15 by means of compressed air or oil under pressure acting on a piston 24′ fixed to the pin 24 and sliding in a cylinder 26. The effect of pressing the clamping pin 24 against the feeler 15 is to fix the feeler 15 in the bore 16. The cylinder 26 communicates with a compressed-air or oil pipe 27 and the air or oil supply is controlled by a valve 28. The valve 28 comprises a slidable element 29′ operable by a solenoid 28′ and provided with a channel 30′ by means of which in one position (dot-dash lines, FIGURE 3) it establishes a connection between the pipe 27 and the compressed-air or oil supply 29, and in another position (solid lines) it connects the pipe 27 with a vent pipe 30. The slidable element 29′ is biased into the latter position by a tension spring 28″.

The valve 28 is controlled by means of an electric circuit consisting of a main switch 31, a switch contact controlled by a pressure gauge 32, and two solenoid-operated relay switches 34 and 35 the coils of which are connected in circuits comprising wires 36, 37 and 38, 37 respectively. The circuit comprising the wire 38 passes through the tool 7 and the conductive packet 4, so that the circuit is closed when the tool 7 is in engagement with the packet but is open when the tool is not in engagement. The pressure gauge 32 actuating the contact consists of a spring-loaded piston 32′ which opens the contact 33 when there is a positive pressure in the pipe 27, and keeps it closed when the pressure in the pipe 27 is sufficiently low.

When the guide and copying plate 18 has been adjusted to the desired conicity, the machine is turned on. The main switch must be closed for this purpose. The effect of the current passing through the closed contact 33 and the wire 36 is that the switch 34 is energized, so that its contacts 34' and 34" are closed. By closing the contact 34", the coil 28' of the valve 28 is energized by way of the wires 39, 40; consequently, the valve 28 is opened, and the pipe 27 is connected to the source of compressed air or oil 29. As the pressure builds up in the pipe 27, the pressure gauge 32 is actuated, so that it opens the contact 33. But the relay switch 34 is not yet caused to open, because current continues to flow through the winding from the holding contact 34".

The pressure in the pipe 27 causes the piston 24' to move the pin 24 against the feeler 15. Owing to the resulting clamping of the feeler 15, the support 8 executes a radial movement as the carriage 9 moves forwards. The extent of the radial movement depends on the inclined position of the plate 18 and corresponds to the required conicity of the rings 2. The tip 7' of the tool 7 therefore executes a corresponding movement.

As soon as the tool 7 encounters the ring 2 which is to be turned, the circuit through the wire 38 is closed, and the coil of the relay switch 35 is thus energized. The contact 35' of the relay switch 35 is closed and its other contact 35", previously closed, is opened. Although the relay switch 34 opens as a result of the opening of the contact 35", the contact 33 controlled by the pressure gauge 32 is still open because the effect of the closing of the contact 35' is that current continues to flow through the coil 28' of the valve 28. Since this also causes the clamping of the feeler 15 to the support 8 to be maintained, the point of the tool 7 describes the required radial movement in contact with the ring 2, resulting in the desired conicity of the ring. The movement of the support 8 in contact with the ring, resulting from the clamping of the feeler 15 to the support 8, moves the shoulder 8' increasingly further away from the stop screw 14 with increasing bending of the leaf spring 12.

As soon as the machining of one ring is completed, i.e. when the tool 7 moves out of engagement with one of the rings 2, the circuit through the wire 38 is interrupted so that the relay switch 35 is de-energized. As the relay switch 34 is also still open, the supply of current to the coil 28' of the valve 28 is interrupted, so that the valve 28 closes whereby the supply of compressed air or oil to the pipe 27 is cut off and the pipe 27 is connected to the vent pipe 30. Owing to the resulting pressure drop in the pipe 27 and in the cylinder 26, the feeler 15 is released. Consequently, the support 8 is returned to its starting position under the action of the leaf spring 12, with the shoulder 8' again in contact with the stop screw 14 on the carriage 9. The tool 7 is thus moved radially away from the packet 4.

The pressure in the pipe 27 falls so low that the spring-loaded piston 32 of the pressure gauge 32 returns to its starting position in which it keeps the contact 33 closed. The relay switch is thus energized again through the circuit including the lead 36, so that the sequence of operations described above are repeated, and the feeler 15 is again clamped to the support 8, so that the tool 7 carries out a successive machining operation in contact with the packet 4.

It is thus possible to turn the individual rings of a packet continuously each to the same conicity by means of one or more tools, using the machine described above. It is important that the support 8 should be controlled by the guide plate 18 by way of the feeler 15, in time with the working rhythm, the desired zig-zag movement of the cutting tools being thereby achieved. Each time the support 8 travels back to its position of contact with the stop screw 14, the feeler 15 slips a corresponding amount further into its bore 16, so that the total displacement of the feeler 15 in the bore 16 is equal to the sum of the individual movements of adjustment of the tool 7 and the support 8. The control of the valve 28 need not necessarily be by electrical means and switches. Instead, suitable mechanical or pneumatic controls may, for example, be provided. Also the clamping pin may be operated by an electro-magnet instead of by fluid pressure acting on the piston 24'.

We claim:

1. A cross-slide control apparatus for taper turning comprising a support, a first slide on said support movable lengthwise of said support, a second slide mounted on said first slide and movable transversely to said support, means for moving said second slide in relation to movement of said first slide comprising an adjustable taper guide mounted on said support for angular adjustment relative to the length of said support, a taper-guide follower reciprocally mounted on said second slide in contact with said taper guide, releasable securing means mounted on said second slide for releasably clamping said follower to said slide, and control means for selectively actuating said releasable securing means.

2. A cross-slide control apparatus for taper turning a number of axially aligned rings in the form of a packet, comprising a support, a tool for performing the turning operation on the ring packet, means on said support for holding the ring packet in centered relationship to said tool, a slide on said support movable lengthwise of said support, a second slide mounted on said first slide and movable transversely to said support, a tool support for said tool mounted on said second slide, means for moving said second slide in relation to movement of said first slide comprising an adjustable taper guide mounted on said support for angular adjustment relative to the length of said support, a taper-guide follower reciprocally mounted on said second slide in contact with said taper guide, releasable securing means mounted on said second slide for releasably clamping said follower to said slide, and control means for selectively actuating said releasable securing means.

References Cited in the file of this patent

UNITED STATES PATENTS

| | | |
|---|---|---|
| 1,695,617 | Teissere | Dec. 18, 1928 |
| 2,208,319 | Bickel | July 16, 1940 |
| 2,360,576 | Overstedt | Oct. 17, 1944 |
| 2,383,266 | Le Tourneau | Aug. 21, 1945 |
| 2,645,967 | Zelewsky | July 21, 1953 |
| 2,782,668 | Richet | Feb. 26, 1957 |
| 2,791,927 | Muller | May 14, 1957 |

FOREIGN PATENTS

| | | |
|---|---|---|
| 1,074,832 | France | Apr. 7, 1954 |

UNITED STATES PATENT OFFICE
CERTIFICATE OF CORRECTION

Patent No. 3,024,685                          March 13, 1962

Werner Buchmüller et al.

It is hereby certified that error appears in the above numbered patent requiring correction and that the said Letters Patent should read as corrected below.

In the grant, line 3, and in the heading to the printed specification, line 5, address of assignee, for "Koln, Germany", each occurrence, read -- Burscheid, near Koln, Germany --.

Signed and sealed this 28th day of August 1962.

(SEAL)
Attest:

ESTON G. JOHNSON                          DAVID L. LADD

Attesting Officer                            Commissioner of Patents